United States Patent
Lanter et al.

[11] Patent Number: 6,143,333
[45] Date of Patent: Nov. 7, 2000

[54] METHOD OF PREPARING A PACKAGED FISH ATTRACTANT BLOCK

[75] Inventors: Kent J. Lanter, Waterloo, Ill.; Gordon C. Ballam, St. Louis, Mo.

[73] Assignee: Purina Mills, Inc., St. Louis, Mo.

[21] Appl. No.: 09/191,693

[22] Filed: Nov. 13, 1998

[51] Int. Cl.⁷ .................................................. A23K 1/02
[52] U.S. Cl. ........................ 426/1; 426/106; 426/132; 426/392; 426/397; 426/420; 426/421; 424/84
[58] Field of Search .............................. 426/1, 72, 74, 426/630, 635, 648, 656, 657, 658, 805, 106, 132, 392, 397, 420, 421; 424/84; 119/230

[56] References Cited

U.S. PATENT DOCUMENTS

| | | |
|---|---|---|
| Re. 31,763 | 12/1984 | Skoch et al. ............................. 426/658 |
| Re. 31,804 | 1/1985 | Skoch et al. ............................. 426/658 |
| 96,288 | 10/1869 | Thorp . |
| 135,113 | 1/1873 | Goodman, Jr. . |
| 871,486 | 11/1907 | Debroisse . |
| 973,549 | 10/1910 | O'Bryant . |
| 1,915,614 | 6/1933 | Parket . |
| 2,452,553 | 11/1948 | Curtis, Jr. et al. ............................. 99/3 |
| 2,631,937 | 3/1953 | Buss ............................................. 99/3 |
| 3,421,899 | 1/1969 | Humphreys ................................. 99/3 |
| 3,428,459 | 2/1969 | Hinds ........................................... 99/3 |
| 3,876,803 | 4/1975 | Stephan et al. ............................. 426/1 |
| 4,160,041 | 7/1979 | Schroeder et al. ................... 426/807 X |
| 4,171,385 | 10/1979 | Skoch et al. ........................... 426/74 X |
| 4,171,386 | 10/1979 | Skoch et al. ........................... 426/74 X |
| 4,265,916 | 5/1981 | Skoch et al. ................................ 426/74 |
| 4,393,087 | 7/1983 | Sullins et al. .............................. 426/74 |
| 4,413,014 | 11/1983 | Melancon ..................................... 426/1 |
| 4,513,657 | 4/1985 | Melancon ................................... 99/472 |
| 4,634,592 | 1/1987 | Faber et al. .................................. 426/1 |
| 4,666,717 | 5/1987 | Smith et al. .................................. 426/1 |
| 4,731,247 | 3/1988 | Wolford et al. .............................. 426/1 |
| 4,752,480 | 6/1988 | Charbonnier et al. ....................... 426/1 |
| 4,764,383 | 8/1988 | Brown et al. ................................ 426/1 |
| 4,826,691 | 5/1989 | Prochnow .................................... 426/1 |
| 4,887,376 | 12/1989 | Sibley et al. ........................... 43/42.06 |
| 4,927,643 | 5/1990 | D'Orazio et al. ........................... 426/1 |
| 5,066,502 | 11/1991 | Eales ......................................... 426/75 |
| 5,071,659 | 12/1991 | Shumaker .................................... 426/1 |
| 5,089,277 | 2/1992 | Prochnow .................................... 426/1 |
| 5,132,120 | 7/1992 | Salte et al. ................................... 426/2 |
| 5,236,717 | 8/1993 | Vinci ............................................ 426/2 |
| 5,262,184 | 11/1993 | Rorvik et al. .............................. 426/72 |
| 5,393,537 | 2/1995 | Rawlins ....................................... 426/1 |
| 5,525,353 | 6/1996 | Fajt ............................................ 424/442 |
| 5,622,739 | 4/1997 | Benton et al. .............................. 426/74 |
| 5,643,622 | 7/1997 | Sawhill .................................. 426/74 X |
| 5,720,996 | 2/1998 | Caprio et al. ................................ 426/1 |
| 5,827,551 | 10/1998 | Prochnow et al. ........................... 426/1 |

*Primary Examiner*—Milton Cano
*Attorney, Agent, or Firm*—Whyte Hirschboeck Dudek SC

[57] ABSTRACT

Sport and game fish are attracted to an area of a lake, stream or other body of water by a fish attractant block comprising a cured formulation of compositional components suspended in the aquatic medium by a rope or similar suspension means. The fish attractant block is prepared by first formulating a relatively homogeneous mixture of the block compositional components, transferring this liquid composition from a mixer to a package equipped with a rope, and then allowing the liquid formulation to cure. Representative ingredients of the formulation include molasses, fish oil, fish meal, attapulgite clay, a phosphate source and magnesium oxide (a curing assist). The blocks of this invention are not only effective at attracting game and sport fish, but they are also water stable and environmentally benign.

13 Claims, 1 Drawing Sheet

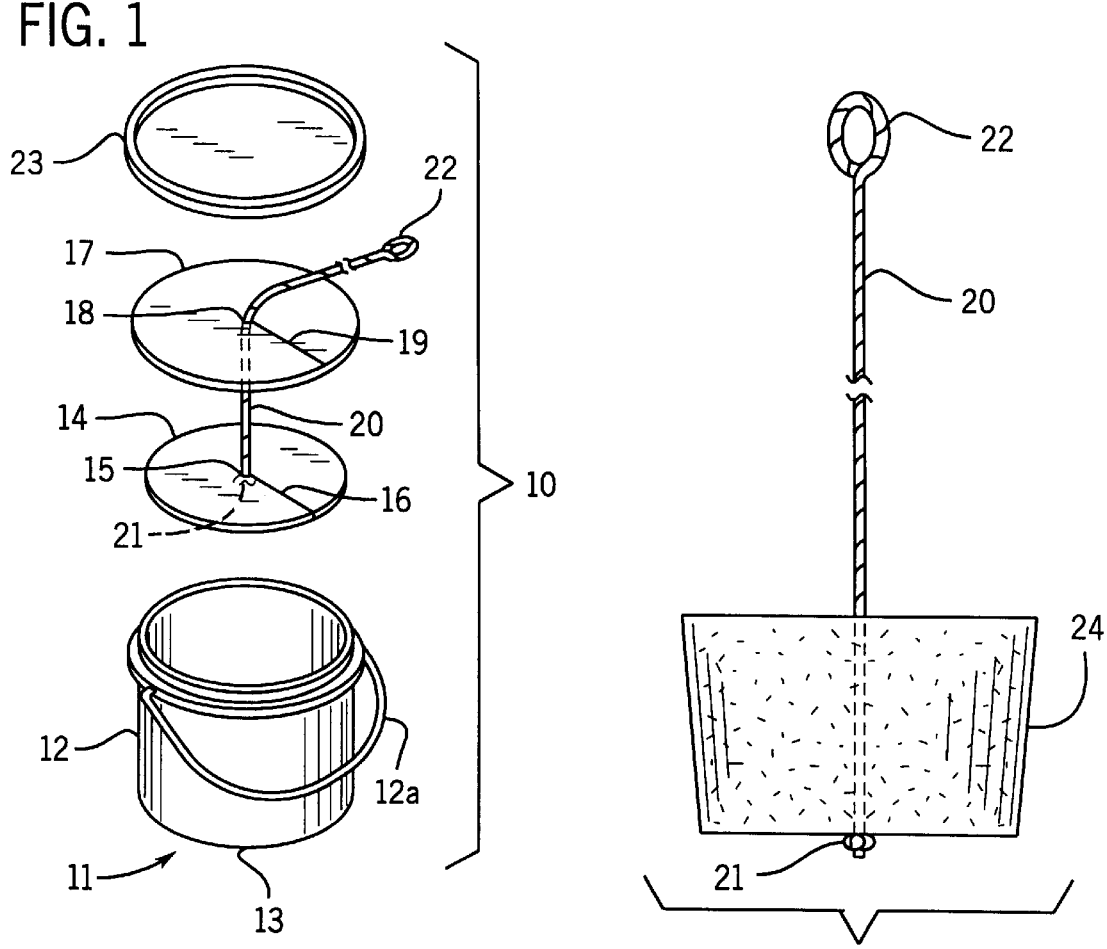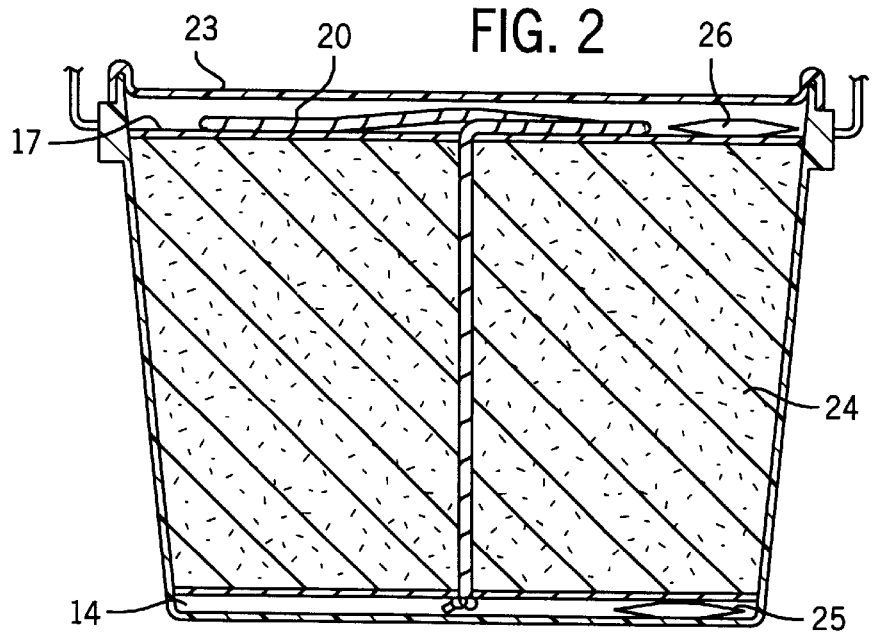

METHOD OF PREPARING A PACKAGED FISH ATTRACTANT BLOCK

BACKGROUND OF THE INVENTION

This invention relates to fish attractants. In one aspect, the invention relates to a fish attractant block while in another aspect, the invention relates to a block constructed for suspension by a rope in an aquatic environment. In another aspect, the invention relates to a method of making the block.

Using bait to attract fish to a specific area within a given body of water is long known in the art. U.S. Pat. Nos. 973,549, 2,452,553 and 2,631,937 are representative examples of this knowledge. The object of these baits is, of course, to attract sport or game fish to an area of a lake or stream in a manner that the fish will become used to feeding in this area, and thus increase their general availability to sport anglers. The bait can attract either game fish, e.g. bass, catfish, sunfish, trout, etc., and/or small feeder fish, e.g. minnows, chums, etc., which in turn attract the larger game fish.

Fish baits or attractants to date have come in varied sizes, shapes and forms. Older forms of fish attractants include, for example, U.S. Pat. No. 96,288 which teaches the preparation of a "cake" of a certain mixture of various kinds of grains which is used in bow or fyke-nets; U.S. Pat. No. 135,113 which teaches a liquid attractant that is applied to ordinary bait or a fish net; U.S. Pat. No. 871,486 which teaches a tough, elastic composition adapted for convenient handling and easy placement upon a hook which, when placed in water, softens to the consistency of a piece of fish; U.S. Pat. No. 973,549 which teaches bait particles which can be attached to an ordinary fish hook or placed within fish traps; and U.S. Pat. No. 2,452,553 which teaches a solid bait designed to slowly dissolve in water, and thus gradually release a fish attractant.

More modern forms of fish attractants include fish bait in the form of salmon eggs (U.S. Pat. No. 3,876,803), a dried ear of corn (U.S. Pat. No. 4,413,014), and artificial lures (U.S. Pat. No. 4,887,376). One particularly preferred form of fish attractant is an aquatic bait block comprising a combination of ingredients which impart to the block resistance to rapid water degradation. Such a block is taught in U.S. Pat. No. 4,634,592 which is incorporated herein by reference. However, these blocks are relatively small in size (three to sixteen ounces) with a water degradeability time of between 18–96 hours. These blocks are typically deployed in fish traps. One variant on aquatic bait blocks are those prepared from dry, compressed material packaged in a plastic "onion sack" type of mesh bag. These blocks also demonstrate relatively rapid dissolution time.

While all of these fish attractants are effective to one degree or another, none are completely satisfactory. For example, most of these fish attractants have a relatively short useful life, e.g. under one week, and most are not designed for deployment at depths intermediate between the surface and bottom of the aquatic body. Still further, those that comprise packaging or deployment devices are typically made from nonbiogradeable material which eventually require removal to avoid environmental and esthetic pollution. Still further, many do not lend themselves to easy packaging and storing and have relatively short (e.g. less than one month) shelf lives.

SUMMARY OF THE INVENTION

According to this invention, a fish attractant block is described that is soluble in water and is designed for easy packaging and storage, has extended shelf and service lives, and is deployable over a range of depths. The block comprises molasses, water, clay, fish oil, fish meal, one or more extruded fish feed products, one or more components to produce a hard, stable block, and optionally, a phosphorus source and/or various nutriments or other additives. The block is formulated in a conventional manner, e.g. the various compositional components of the block formulation are mixed with one another to form a relatively homogeneous liquid mass which is then poured into a block mold or package, and during this packaging step, the block is fitted with a rope or other suspension device which upon solidification of the formulation, will allow the block to be deployed at its intended depth within an aquatic environment, e.g. river, lake, ocean, etc.

In one embodiment of this invention, the fish attractant block is prepared by a process comprising the steps of:

a) preparing a relatively homogeneous liquid formulation of the block compositional components;

b) providing a block package comprising at least one sidewall, a bottom wall and a removable top wall;

c) inserting into the block package a bottom pad of approximately the same size as the inner surface of the bottom wall and which rests near or upon the bottom wall;

d) inserting a suspension means that extends from below the bottom pad up through and out of the package with the top wall removed;

e) pouring the liquid, relatively homogeneous block formulation into the package such that the bottom pad is completely covered;

f) inserting a top pad over the top surface of the liquid formulation prior to the cure of the liquid formulation, and in a manner such that the suspension means extends through the top pad and the top pad is fitted within the package;

g) curing the liquid formulation; and h) sealing the package with the removable top wall.

In one embodiment, oxygen scavengers are placed in the package between the bottom wall and bottom pad and between the top wall and top pad, and the package is sealed against the entry of oxygen from outside the package.

When ready for use, the package is opened, the cured block is removed, the top and bottom pads are removed from the cured block, and the block is suspended in the water by the suspending device, e.g. rope, passing through the cured block.

BRIEF DESCRIPTION OF THE DRAWINGS

FIG. 1 is an exploded view of the packaging components of one embodiment of the invention.

FIG. 2 is a cut-away, cross-sectional view of one embodiment of a packaged fish attractant block.

FIG. 3 is a side perspective of one embodiment of a fish attractant block ready for deployment into an aquatic body.

DESCRIPTION OF THE PREFERRED EMBODIMENTS

The formulation of the fish attractant block of this invention is similar to, but different from, that of the animal feed blocks described in U.S. Pat. No. 4,265,916 and Re. 31,763, both of which are incorporated herein by reference. Typically, the formulation comprises the components or ingredients in weight percent, based upon the weight of the formulation before cure as described in Table I.

| Compositional Component | Percent by Weight (Broad) | Percent by Weight (Preferred) | Percent by Weight (More Preferred) |
| --- | --- | --- | --- |
| molasses | 15–85 | 25–60 | 35–45 |
| water | >0–25 | 5–20 | 10–15 |
| phosphate | 0–8 | >0–2 | 0.1–0.3 |
| clay | 0.2–4 | 0.4–3 | 1–2 |
| magnesium oxide | 2–10 | 3–6 | 3.5–4.5 |
| fish oil | 1–20 | 2–10 | 3–5 |
| fish meal | 3–27 | 5–22 | 10–18 |
| fish feed | 5–30 | 10–25 | 18–22 |

Molasses, which is the major, i.e., it is present in the greatest amount by weight, ingredient of the composition, can be any commercial molasses product. It can be any of the sugar containing molasses such as those obtained as the by-products of the processing of sugar beets, sugar cane, corn or wood. Exemplary of these are black strap molasses, converted molasses, wood sugar molasses, hydro syrup, citrus molasses, beet molasses and the like. Molasses has varying amounts of solids which affect its viscosity and the measure of the amount of such solids is normally given in the terms of Brix. Without limitation on the present invention, the consistency of commercially available molasses which may be used in the practice of this invention normally falls within the range of 60° to 90° Brix.

With respect to the clay constituent in the formulation, it should be water absorbent and those that can be employed include attapulgite clay, bentonite, kaolin and mixtures thereof. Attapulgite clay is preferred. Clay is believed to be a suspending agent which, upon high speed shear mixing, suspends and prevents segregation of the other ingredients. This, in turn, allows the formulation to set into a hard block in which the ingredients are relatively uniformly dispersed throughout the block.

The phosphorous source, if present, should be water soluble, and it should be added to the nutrient block formulation in an amount effective to aid in dispersing the water absorbent clay in such a manner as to fully utilize its capabilities as a suspending agent. Although either or both can be used in the practice of this invention, tetrasodium pyrophosphate is preferred for the purpose of dispersing the clay, and monoammonium phosphate is preferred for the purpose of nutrition.

In addition to fish oil (a readily available commercial product, and which is a separate ingredient over and above that which may be present as a component of another ingredient, e.g., fish feed), other edible animal and vegetable fats and oils can be present in the formulation. These include soybean oil, cottonseed oil, grease, bleachable fancy tallow, yellow grease, beef fat and the like. The total fat source present in the formulations of this invention, including the fish oil, usually do not exceed about 30% by weight. In addition to providing energy to the fish, the fat source is an assist in the blocking or curing process.

The nature of the magnesium oxide used to prepare the formulations of this invention is not critical, but preferably the magnesium oxide should be of a sufficient reactivity, particle size and surface area such that it produces a reasonably hard block within a relatively short period of time. The magnesium oxide should be present in the formulation in an effective amount to set the nutrient block within a relatively short period of time, e.g. in about 24 hours at about 80° F., preferably 110° F.

Although not necessary to the practice of this invention, ferrous sulphate is known to speed the blocking, i.e. curing, reaction. Without ferrous sulphate, the blocking reaction may take an undesirable amount of time at ambient temperature. With ferrous sulphate, the block sets or hardens relatively quickly, e.g. within a day at ambient conditions. If present, then typically the ferrous sulfate is present in an amount from about 2 to about 8 percent by weight, more preferably from about 2 to 4 percent by weight (again, based on the total weight of the cured formulation).

Fish meal (a separate ingredient over and above that which may be present as a component of another ingredient, e.g., fish feed) and fish feed are the principal sources of protein for the fish attractant block although other sources of protein can also be used, e.g., grains, spent soy flakes, soybean meal, cottonseed meal, and peanut meal. Both the fish meal and fish feed are readily available, commercial products. Typically, the fish feed is an extruded product comprising a mixture of various fats, protein sources, water and a variety of minerals, nutrients and/or medicaments. Representative fish feed includes Purina Trout Chow™ and Purina Catfish Chow™.

Other ingredients can also be dispersed and suspended in the above formulation to create an effective, diverse fish attractant or feed. Forms of natural protein such as, and other components such as medicaments, hormones, vitamins, minerals, antibiotics, and the like are optional ingredients. Components that assist in the curing or setting of the block, e.g. ferrous sulphate, can also be included. These supplemental nutritive or curing components may be individually present in amounts ranging from zero to 25% by weight based upon the weight of the cured block.

One typical process for preparing a liquid relatively homogeneous formulation of the compositional components of the fish attractant block of this invention comprises mixing water, molasses, the phosphorous source and clay under high speed shearing action for an effective amount of time, preferably about two minutes, to disperse the clay. After the clay is dispersed, the fish oil and other fat source ingredients are added followed by any nutritive ingredients, e.g. fish meal, grains, etc., followed by any vitamins, minerals, nitrogen sources, e.g. urea, etc. Finally, the magnesium oxide is added shortly before the formulation is ready for pouring into a container or mold. The formulation is subjected to sufficient agitation by any means for a sufficient period of time to insure that its compositional components are relatively homogeneously dispersed throughout its liquid volume.

Once the liquid formulation is ready for packaging, it is transferred, typically by pouring, from the container holding the liquid formulation to the block molds or packaging. The blocks can be of any size and configuration, but typically are between about 1 and 500, preferably between about 5 and 200 and more preferably between about 8 and 12, pounds. Preferably the liquid composition is transferred directly to the block packaging which serves as both the mold and the shipping and storage container. The packaging can be constructed of any suitable material, e.g. waxed cardboard, plastic, etc., and can of any convenient configuration, e.g. rectangular boxes, tubes, pails or buckets, and the like. Whatever the package or container, it consists of at least one side wall, a bottom wall and a removable top wall. Examples include a bucket or pail in which the side wall is cylindrical in shape, the bottom wall is permanently affixed to one end of the side wall and the top wall or cover is removably affixed to the other end of the side wall. Another example of a suitable container is a waxed cardboard, square carton consisting of four side walls permanently affixed to one bottom wall and the removable top wall can be in the form of either a removable lid or flaps attached to each of the four side walls in such a manner to allow reasonably complete closure of the container. The block packaging is assembled such that it will not leak the liquid formulation during or after the fill operation, nor will it admit oxygen once the fill operation is completed and the package sealed. In those instances in which the package does not lend itself to a relatively air-tight seal, a liner with oxygen barrier properties, e.g. saran, can be used. Preferably, the package is constructed in such a manner that such a liner is not required.

The process for preparing the fish attractant block of this invention is illustrated in more detail by reference to the figures. FIG. 1 describes the packaging for one embodiment of the invention. Packaging components 10 are shown in exploded form comprising a pail or bucket 11 itself comprising a cylindrical side wall 12, a bottom wall 13 and a handle 12a. Cardboard disk 14 is approximately the same size, but preferably slightly larger, than bottom wall 13 and is sized and shaped to fit tightly within pail 11 and on top of the inside surface of bottom wall 13. Cardboard disk 14 has a center hole 15 and slit 16 that extends from center hole 15 to the perimeter of disk 14. Cardboard disk 17 is similar in configuration and features as cardboard disk 14, but it is typically slightly larger than disk 14 because pail 11 is typically tapered with the taper wider at the top of the pail than at the bottom of the pail. Cardboard disk 17 has a center hole 18 and slit 19 which runs from center hole 18 to the perimeter of cardboard disk 17. In one embodiment of the invention, cardboard disk 14 and cardboard disk 17 are interchangeable. In another embodiment of the invention, center holes 15 and 18 are simply the internal ends (i.e. the ends at or nearest the center of disks 14 and 17) of slits 16 and 19, respectively.

Cardboard disks 14 and 17 are connected to one another by rope 20 which has knot 21 on one end and in one embodiment, a loop 22 on the other end. In other embodiments, loop 22 is replaced by either a knot or simply the end of the rope, i.e. the end of the rope without a knot, loop or similar feature.

The closing feature of the package is lid 23 which is sized and shaped to fit tightly over the open end of bucket 11. Preferably, lid 23 forms an air-tight seal with bucket 11.

FIG. 2 illustrates a packaged fish attractant block.

In the preparation of the fish attractant block of this invention, knot 21 is made in rope 20, and then rope 20 is fitted into center hole 15 of cardboard disk 14 by way of slit 16. Rope 20 is then pulled through center hole 15 such that knot 21 abuts the bottom surface of cardboard disk 14. Obviously, knot 21 is sized such that it will not pass through center hole 15. In certain embodiments of this invention (not shown), a washer or similar device can be inserted between knot 21 and center hole 15 to insure against accidental passage of knot 21 through hole 15.

Cardboard disk 14 is then inserted into the bottom of bucket 11 such that knot 21 is between the inside surface of bottom wall 13 and bottom surface of cardboard disk 14. In a preferred embodiment, an oxygen scavenger (packet 25 in FIG. 2), e.g., Fresh Pax by Multisorb Technologies, Inc., is also inserted between the innersurface of bottom wall 13 and the bottom surface of cardboard disk 14. The oxygen scavenger is used in an amount sufficient to reduce the oxygen level in the closed package such that growth of mold or other organic contamination of the compositional components of the block is inhibited.

Once cardboard disk 14 and rope 20 are inserted into the bottom of bucket 11 (with the other end of rope 20 extending out of bucket 11 and over its open edge), the relatively homogeneous liquid mass of compositional components of the fish attractant are poured or otherwise transferred into bucket 11 so as to fill most of its volume. The temperature of the liquid formulation at the time of transfer from the mixer or other vessel holding the liquid formulation to the block package can effect the ease by which the block eventually releases from a package. If the temperature is too low, the block has a tendency to stick within the package. If the temperature is too high, the block has a tendency to cure quickly and thus shorten the working time available for transferring the liquid formulation from the packaging tank to the packaging. Accordingly, the temperature of the liquid formulation at transfer is typically between about 100 and 180, preferably between about 120 and 165 and more preferably between 140 and 150,° F. Cardboard disk 17 is then fitted about that portion of rope 20 extending beyond the liquid contents of bucket 11 by sliding it through slit 19 into center hole 18 and then pushing cardboard disk 17 down the length of rope 20 until cardboard disk 17 is in contact with the top surface of the liquid formulation. Rope 20 is then drawn taunt over the length of rope 20 extending from cardboard disk 14 to cardboard disk 17, the extra length of rope 20 is laid on top of cardboard disk 17, and oxygen scavenger (packet 26 in FIG. 2) is placed on the top surface of cardboard disk 17 such that it and the length of rope 20 extending beyond the formulation are retained in the area between the top surface of disk 17 and the inside of lid 23. Lid 23 is then placed on top of the open end of bucket 11 in such a manner as to seal bucket 11 against moisture and oxygen. In one embodiment of this invention (not shown), a liner is inserted either above or below cardboard disk 17, the liner containing a oxygen barrier. Of course, such a liner is fitted to the formulation within bucket 11 such that it forms an effective oxygen barrier between the formulation and the environment. Preferably, the formulation is allowed to cure (i.e. set) or substantially cure before lid 23 (or a liner) is placed upon bucket 11.

Bucket 11 can be made of any suitable material, e.g. waxed cardboard, polypropylene, high density polyethylene, metal, etc., and it can take any size or configuration. Sizes of about 10 pounds are preferred in that the formulations will often remain effective over a two- to four-week period in relatively still water. The buckets are typically equipped with handles or similar devices to facilitate transportation of the finished product.

Likewise, the cardboard disks can be constructed from a wide range of materials including plastic, metal, and the like. While the disks take the shape of the container in which they are used, they can take other shapes as well, e.g. a square or rectangular shape, sized to fit within the container. While a center hole for positioning the rope is typical and preferred, two or more holes positioned anywhere on the disk can also be used. Similarly, while slits are used to accommodate the insertion and removal of the rope, these are not required if the rope is threaded through the hole in the disk (similar to threading a needle).

Since in practice the rope is the only component of the fish attractant block that is not intended for ultimate consumption by the fish, preferably the rope is made from a readily biodegradeable material, e.g. a twisted cotton rope. However, suspension devices other than rope, e.g. wire, etc., can be used although these are less preferred because good environmental practice requires the ultimate recovery of this material from the environment. The lid is preferably and typically of the same material as the bucket, and preferably it provides an air-tight seal with the bucket. In another preferred embodiment of the invention, the lid is of a tamper-evident design.

After the formulation has been transferred into the bucket, preferably, the formulation is allowed to cure (i.e. set or harden) for at least 24 hours. After cure, the bucket is cooled and sealed as described above and the formulation is stable until the air-tight seal of the bucket is broken. Shelf lives in excess of a year are typical. Likewise, the ease at which the cured formulation releases from its packaging is also influenced by the timing of the closure of the package. If the package is sealed before the liquid formulation is substantially cured, then the blocks are not easily removed from their packaging. Accordingly and preferably, the packages are not sealed in an air-tight manner until after the blocks are substantially cured.

To deploy the fish attractant block, the cured formulation is withdrawn from the bucket (typically by inverting the bucket and pushing on its bottom wall), removing the cardboard disks from the top and bottom surfaces of the cured formulation, and then suspending the formulation by the rope in the aquatic environment of choice. If the intent is to suspend the cured block at a depth greater than that allowed by the length of rope extending from the cured formulation, then a suitable length of any suspension device, e.g. additional rope, wire, chain, etc., is attached to the rope by means of the loop or otherwise. Depending upon the nature of the aquatic environment, e.g. still, strong or weak current, strong or weak wave action, etc., a ten pound block has a life of from a few days to about a month. FIG. 3 illustrates the fish attractant block in a form ready for deployment. It consists of rope 20 extending through the center of cured formulation 24.

The following examples are illustrative of certain specific embodiments of this invention. Unless indicated to the contrary, all parts and percentages are by weight.

SPECIFIC EMBODIMENTS

Example 1

The following procedure was used to prepare a homogeneous liquid formulation for use in the preparation of a fish attractant block. The ingredients were blended in a Myers five-gallon lab mixer in the following sequence:

| Ingredient | Weight Percent | Procedure |
| --- | --- | --- |
| cane molasses | 38.1 | Add |
| water | 12 | Add |
| tetrasodium pyrophosphate | 0.2 | Add mix 15 seconds |
| attapulgite clay | 1.5 | Add mix 2 minutes |
| fish oil | 4.0 | Add mix 15 seconds |
| magnesium oxide (block grade) | 4.0 | Add mix 1 minute |
| sucrose | 3.0 | Add |
| salt | 1.2 | Add |
| betaine, anhydrous | 3.0 | Add |
| calcium carbonate | 1.5 | Add |
| deflourinated phosphate | 1.8 | Add |
| fish meal | 16 | Add mix 2 minutes |
| extruded fish feed* | 20 | Add mix 30 seconds |

*Purina Trout Chow ™ a typical formulation of which comprises, in weight percent based on the total weight of the formulation, ground corn (22), wheat middlings (5), dehulled soymeal (21.5), blood meal (0.5), feather meal (3), fish meal (25), poultry meat meal (15), external fish oil (7), and vitamins and trace minerals (1).

Once the liquid formulation was relatively homogeneous, 10 pounds was poured into a 7×7×7 inch wax-coated corrugated box. Before the formulation was poured into the box, a two-foot long, 3/16 inch twisted cotton rope (biodegradable) was placed into the box and positioned in the center of the block by securing it to the center of a bottom pad (which was inserted into the bottom of the box before the liquid formulation was poured into it). After filling, the rope was pulled taunt and the top box flaps closed in such a manner as to leave the length of rope extending beyond the formulation outside of the box. The blocks were then cured in a heated room at 110° F. for 48 hours. After cure, the blocks were tested for effectiveness and water stability in live trials, and the blocks proved effective for attracting fish and for stability over periods ranging from two to four weeks.

Example 2

Following a similar procedure as that in Example 1, the following fish attractant block formulation is prepared:

| Ingredient | Weight Percent | Procedure |
| --- | --- | --- |
| molasses | 40 | Add |
| water | 12 | Add |
| tetrasodium pyrophosphate | 0.15 | Add mix 15 seconds |
| attapulgite clay | 1.5 | Add mix 2 minutes |
| fish oil | 4.0 | Add mix 15 seconds |
| magnesium oxide (block grade) | 4.0 | Add mix 1 minute |
| sucrose | 1.0 | Add |
| salt | 1.2 | Add |
| betaine, anhydrous | 0.5 | Add |
| deflourinated phosphate | 1.8 | Add |
| calcium carbonate | 1.5 | Add |
| blood meal | 1.0 | Add mix 15 seconds |
| shrimp meal | 1.0 | Add mix 15 seconds |

-continued

| Ingredient | Weight Percent | Procedure |
|---|---|---|
| fish meal | 10.4 | Add mix 2 minutes |
| multi-size extruded fish feed* | 20 | Add mix 30 seconds |

*Purina Catfish Chow ™ a typical formulation of which comprises, in weight percent based on the total weight of the formulation, ground corn (28), ground wheat (0.5), wheat middlings (20), dehulled soymeal (34), feather meal (5), fish meal (8), meat meal (3), fat (1), and vitamins and trace minerals (0.5).

The liquid formulation is poured into 10-pound polypropylene buckets (approximately five quarts) which are previously fitted with (1) a cardboard bottom pad or disk equipped with a knotted, twisted cotton rope centered through the pad, and (2) an oxygen scavenger from Multisorb Technologies, Inc., of Buffalo, N.Y., which is placed between the inner surface of the bottom of the bucket and the bottom surface of the bottom pad. The liquid formulation is poured into the bucket at a temperature of between about 140 and 150° F. Immediately after pouring the liquid formulation into the bucket, a top cardboard pad or disk is applied to the top surface of the formulation and a rope fitted through it and pulled taunt to insure it is aligned through the middle of the block. After the top cardboard pad is placed on the top surface of the liquid formulation, the buckets are removed to a warehouse and the formulations allowed to cure for three to four days. After cure, the oxygen scavenger is placed on the top surface of the top pad, the length of rope extending beyond the cured block also is placed on the top surface of the top pad, and the bucket is then sealed in an air-tight manner.

The fish attractant blocks of this example were then field tested, and they removed easily from their containers and proved effective at attracting fish. They also demonstrated a water stability under relatively still conditions of two to four weeks.

What is claimed is:

1. A packaged fish attractant comprising:
   an attractant block including a top, a bottom and side surfaces;
   a package enclosing the attractant block comprising, a bottom wall fixedly attached to at least one side wall, the bottom wall and the at least one side wall having inner surfaces;
   a removable cover in sealing contact wit the at least one side wall, the cover having an inner surface;
   a bottom pad having top and bottom surfaces and of approximately the same size and shape as the inner surface of the bottom wall, the pad positioned such that the top surface of the pad is in contact with the bottom surface of the block and the bottom surface of the pad is near or in contact with the inner surface of the bottom wall;
   a top pad having top and bottom surfaces and of approximately the same size and shape as the inner surface of the cover, the pad positioned such that the bottom surface of the pad is in contact with the top surface of the block and the top surface of the pad is near or in contact with the inner surface of the cover;
   at least one oxygen scavenger positioned either between the inner surface of the cover and the top surface of the top pad or between the inner surface of the bottom wall and the bottom surface of the bottom pad; and
   means for suspending the block extending from beneath the bottom surface of the bottom pad, through the block, to above the top surface of the top pad.

2. The packaged fish attractant block of claim 1 in which the package is a plastic pail with a removable lid.

3. The packaged fish attractant block of claim 1 in which the package is a waxed cardboard box.

4. The packaged fish attractant block of claim 1 in which the top and bottom pads are made of cardboard.

5. The packaged fish attractant block of claim 1 in which the suspension means is a biodegradable rope.

6. The packaged fish attractant block of claim 1 in which the oxygen scavenger is enclosed with a packet.

7. A method of preparing a packaged fish attractant block, the method comprising the steps of:
   preparing a substantially homogeneous liquid formulation of the block;
   providing a block package comprising at least one side wall, a bottom wall and a removable cover, the at least one side wall and bottom wall having inner surfaces;
   inserting into the block package a bottom pad of approximately the same size and shape as the inner surface of the bottom wall and which rest near or upon the bottom wall;
   inserting a means for suspending the block that extends from below the bottom pad through and out of the package with the cover removed;
   pouring the liquid, substantially homogeneous block formulation into the package such that the bottom pad is completely covered;
   inserting a top pad over the top surface of the liquid formulation prior to the liquid formulation becomes cure, and extending the suspending means through the top pad and the top pad is fitted within the package;
   curing the liquid formulation; and
   sealing the package with the removable cover.

8. The method according to claim 7 wherein the package is a plastic pail.

9. The method according to claim 7 wherein the package is a waxed cardboard box.

10. The method according to claim 7 wherein the top and bottom pads are made from cardboard.

11. The method according to claim 7 wherein the suspending means is a biodegradable rope.

12. The method according to claim 7 wherein an oxygen scavenger is placed in the package between the bottom wall and bottom pad and between the cover and the top pad, and the package is sealed against the entry of oxygen from outside the package.

13. The method according to claim 7 wherein the liquid formulation is allowed to cool before the package is sealed.

* * * * *

UNITED STATES PATENT AND TRADEMARK OFFICE
CERTIFICATE OF CORRECTION

PATENT NO.   : 6,143,333
DATED        : November 7, 2000
INVENTOR(S)  : Kent J. Lanter, el at.

It is certified that error appears in the above-identified patent and that said Letters Patent is hereby corrected as shown below:

On the Title page, item 54 Title
Replace "METHOD OF PREPARING A PACKAGED FISH ATTRACTANT BLOCK"
with-- METHOD OF PREPARING A PACKAGED FISH ATTRACTANT BLOCK AND PACKAGED FISH ATTRACTANT--.

Column 9:
Line 48, replace "wit"with --with--.

Column 10:
Line 19, replace "with" with --within--.

Signed and Sealed this

Twelfth Day of June, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,143,333
DATED : November 7, 2000
INVENTOR(S) : Kent J. Lanter, el at.

It is certified that error appears in the above-identified patent and that said Letters Patent is hereby corrected as shown below:

On title page, item 54 Title
Replace "METHOD OF PREPARING A PACKAGED FISH ATTRACTANT BLOCK" with --METHOD OF PREPARING A PACKAGED FISH ATTRACTANT BLOCK AND PACKAGED FISH ATTRACTANT--.

Column 9,
Line 48, replace "wit" with --with--.

Column 10,
Line 19, replace "with" with --within--.

Signed and Sealed this

Twenty-sixth Day of June, 2001

*Attest:*

*Attesting Officer*

NICHOLAS P. GODICI
*Acting Director of the United States Patent and Trademark Office*